April 26, 1960

T. BACKUS ET AL 2,934,185

AUTOMOTIVE DEVICE

Filed Aug. 1, 1957

INVENTORS
THOMAS BACKUS
CHARLES M. PERKINS
BY
Woodhams Blanchard and Flynn

ATTORNEYS

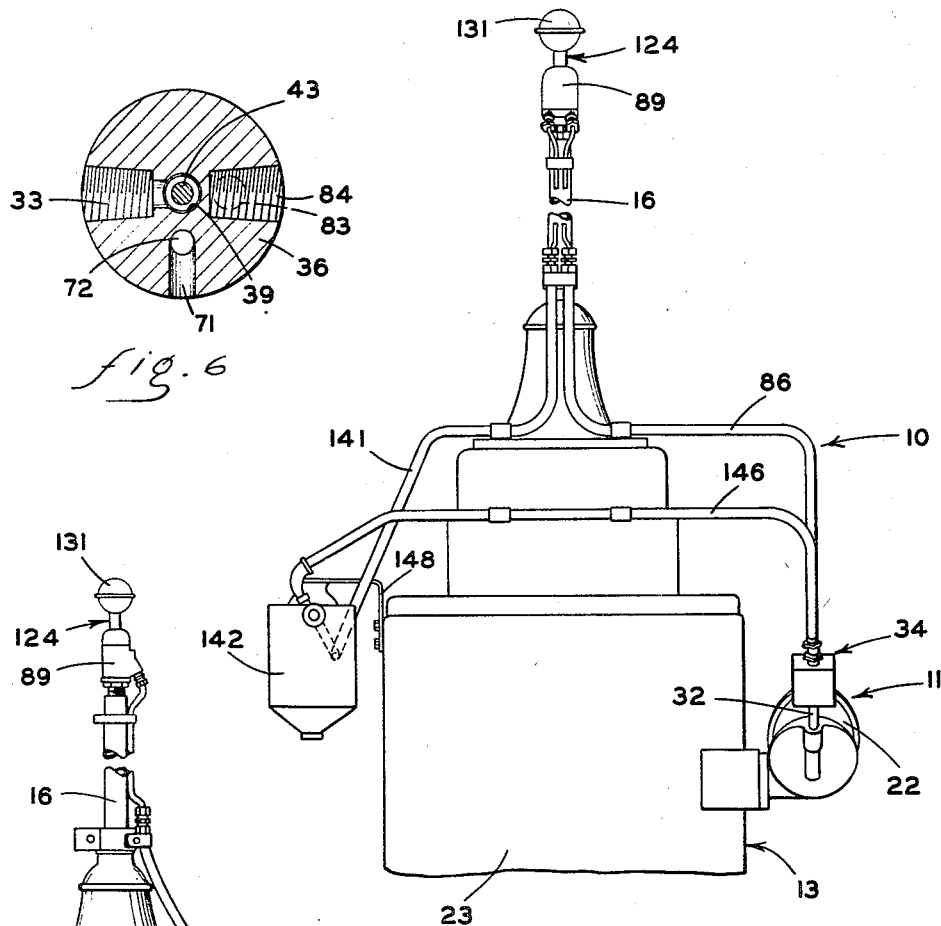
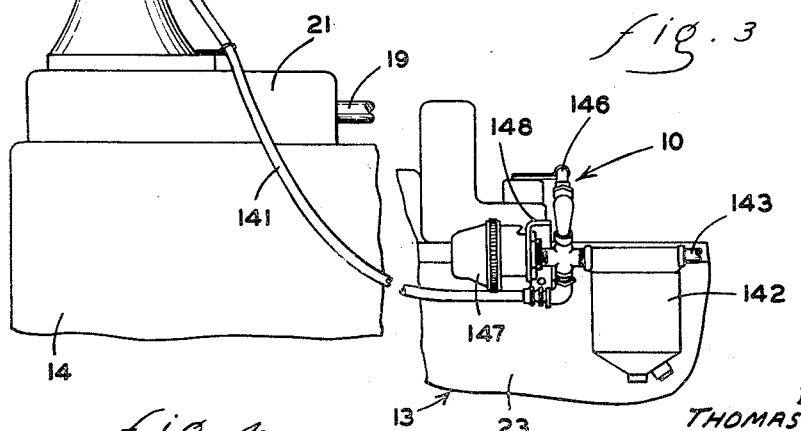

April 26, 1960
T. BACKUS ET AL
2,934,185
AUTOMOTIVE DEVICE
Filed Aug. 1, 1957
3 Sheets-Sheet 3
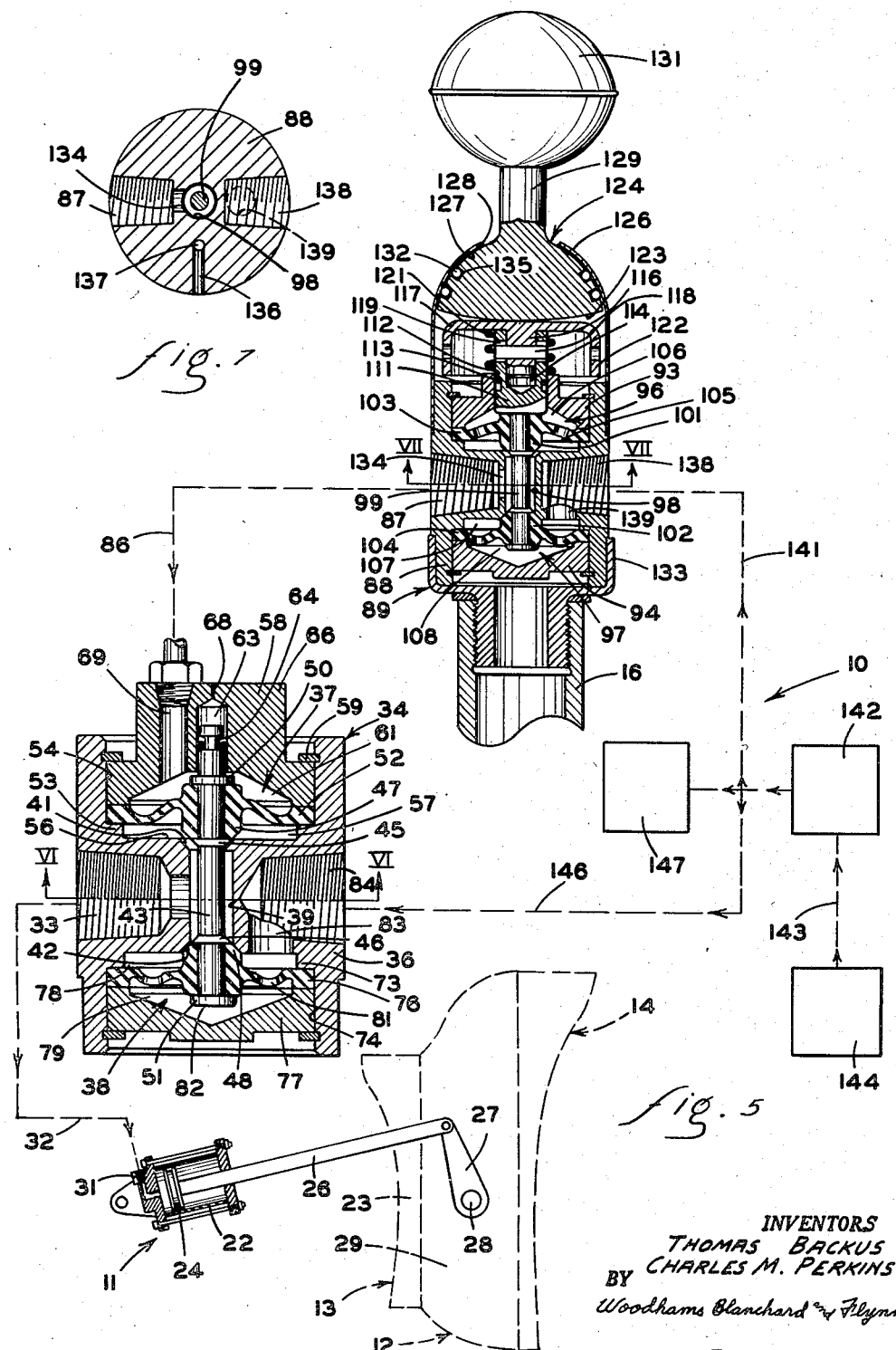
INVENTORS
THOMAS BACKUS
CHARLES M. PERKINS
BY
Woodhams Blanchard & Flynn
ATTORNEYS United States Patent Office 2,934,185
Patented Apr. 26, 1960

2,934,185
AUTOMOTIVE DEVICE

Thomas Backus, Kalamazoo, and Charles M. Perkins, Kalamazoo Township, Kalamazoo County, Mich., assignors, by mesne assignments, to Fuller Manufacturing Company, a corporation of Delaware Application August 1, 1957, Serial No. 675,781

5 Claims. (Cl. 192—3.5)

This invention relates in general to apparatus for disengaging a resiliently engaged clutch and, more particularly, to such an apparatus having an improved system for remotely and automatically controlling a clutch disengaging mechanism, said control system including a device mounted upon, and responsive to the movement of, a manually actuable shift lever.

In the development of heavy duty engine driven equipment, such as relatively large trucks and similar vehicles, there has long been a desire, and numerous attempts, to place the operator's compartment in a position spaced from its conventional location substantially above the clutch mechanism. This results, in some instances, from a desire to place the operator's compartment as far forward as possible, hence directly above the engine, in order to increase the space available for carrying pay load. It has also resulted, in other instances, from the placing of both the engine and transmission at the rear end of the vehicle. In either case, the use of mechanical linkage for effecting disengagement of the clutch, which clutch is necessarily located between the engine and the transmission, becomes inconvenient and the use of pressure fluid operated clutch disengaging mechanisms has been attempted, whereby the clutch can be remotely operated without the need for mechanical linkage. The previous practice, where fluid pressure actuated devices of this general type are utilized, has been to conduct the pressure fluid in series from the source to some manually controllable device in the operator's compartment and thence to the actuating mechanism. This, however, has necessitated the use of long reaches of relatively large gauge conduit for conducting the pressure fluid to the actuating mechanism. Furthermore, this practice has required the use of a remote control device capable of passing the same high volume and high pressure required to operate the actuating mechanism, thereby increasing the possibility of leakage and consequent failure of the system.

While studying this problem, it was found that by placing a relay valve in the conduit conducting the pressure fluid from its source to the clutch disengaging mechanism, it would be possible to remotely operate the disengaging mechanism by controlling the relay valve. It was recognized that there would be considerable advantage in controlling the relay valve by pressure fluid, and thereby avoid the problems, primarily maintenance, of a separate type of control system, such as electrical. It was also found that, by properly designing the said relay valve it would be possible to use much smaller volumes and pressures for operating the relay valve than would be required under some circumstances for operating the disengaging mechanism. Accordingly, a relatively small pressure fluid control device could be utilized to control the flow of pressure fluid for operating the relay valve.

Accordingly, the principal object of this invention has been the provision of a remotely actuable control system for a pressure fluid operated clutch releasing mechanism, wherein the clutch releasing mechanism is connected to the source of pressure fluid through a pressure fluid operated relay valve and a relatively short conduit, and wherein the relay valve is operated by a remotely located, manually operable device which can be spaced any reasonable distance from the clutch releasing mechanism without altering in any way the flow of operating pressure fluid from the source to said releasing mechanism.

A further object of this invention is the provision of a control system for a clutch releasing mechanism, as aforesaid, wherein the manually operable device for controlling the operation of said relay valve is a valve connected to said pressure source and to said relay valve for controlling the flow of the pressure fluid which operates said relay valve, such flow being entirely independent of the flow of pressure fluid from said source to the releasing mechanism.

A further object of this invention is the provision of a control system, as aforesaid, wherein said manually operable control valve is sufficiently small that it can be mounted upon a manual shift lever, and is so constructed that it can be operated in response to the normal forces applied to said lever to effect a shift thereof.

Other objects and purposes of this invention will become apparent to persons familiar with this type of equipment upon reading the following specification and examining the accompanying drawings, in which:

Figure 3 is an end elevational view of the engine transmission combination shown in Figure 2.

Figure 4 is a broken side elevational view of the engine transmission combination shown in Figure 2 as viewed from the opposite side thereof.

Figure 5 is a schematic view of the structure shown in Figure 2 with the relay valve and control valve thereof shown in central cross-section.

Figure 6 is a sectional view taken along the line VI—VI of Figure 5.

Figure 7 is a sectional view taken along the line VII—VII of Figure 5.

Figure 1:
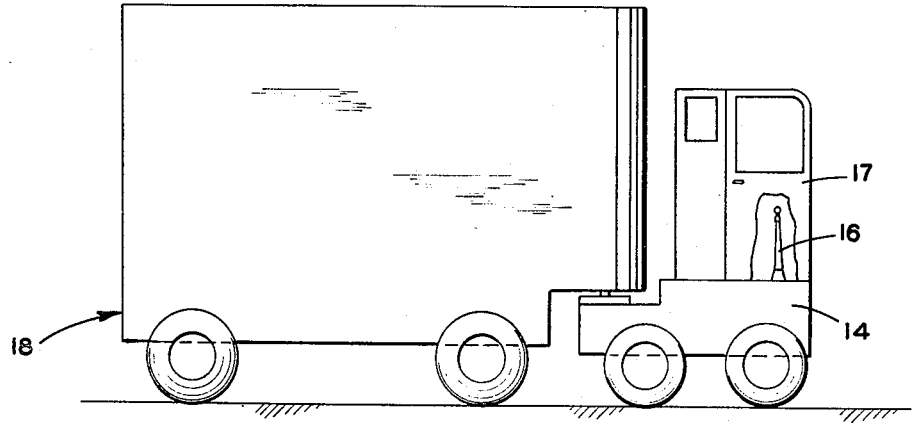
Figure 1 is a broken side elevation view of a vehicle of the cab over engine type wherein the control system of the invention is especially useful.
Figure 2:
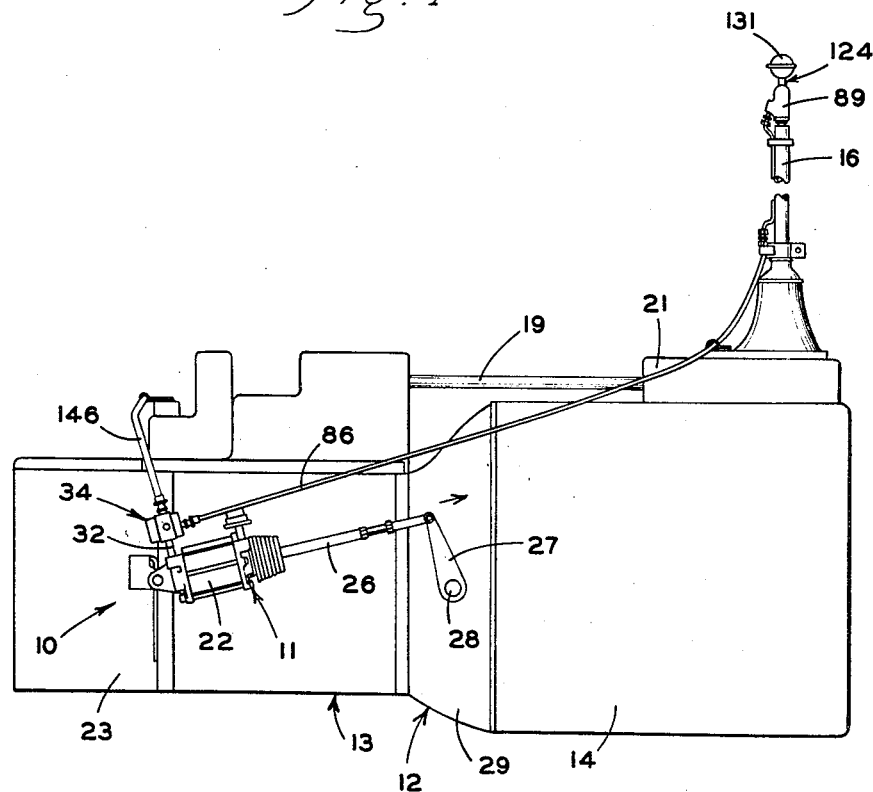
Figure 2 is a side elevational view of an engine transmission combination of the type utilized in the vehicle shown in Figure 1 and employing the invention.

For the purpose of convenience in description, the terms "upper," "lower," and other similar expressions relating to position or direction will have reference to the structure embodying the invention in its normal position of use, which is as shown in Figures 1 and 2. The terms "inner," "outer," and derivatives thereof, will have reference to the geometric center of said structure, and parts thereof.

*General description*

In order to carry out the objects and purposes set forth above, a control system has been provided for operating a conventional clutch releasing mechanism. Said releasing mechanism includes a pressure fluid operated power cylinder connected by linkage to a conventional, resiliently engaged, clutch disposed between an engine and a transmission. Said power cylinder is also connected to a source of pressure fluid through a relay valve which constitutes a part of the pressure fluid control system. Said relay valve is operated by pressure fluid from said source which travels through an independent path including a manually operable flow control valve. In this particular embodiment, said flow control valve is integrated into a shift lever whereby said clutch is released preceding each shift of the transmission.

*Detailed construction*

The control system 10 (Figures 2, 3 and 5), to which this invention relates, is designed in this particular embodiment for controlling a pressure fluid operated, clutch releasing mechanism 11. Said clutch releasing mechanism 11 is in turn arranged to operate a clutch 12 for connecting or disconnecting a transmission 13 (Figure 2) from an engine 14 in an otherwise substantially conventional manner. In this particular embodiment, the manually operable shift lever 16 is shown mounted within the cab, or operator's compartment 17 (Figure 7) of a heavy duty vehicle 18 wherein said cab is mounted above said engine 14. The shift rods 19 of the transmission 13 are here extended in a substantially conventional manner into a suitable housing 21 on top of the engine 14 and below the shift lever 16 for operation by said shift lever 16.

The engine 14 may be of any convenient, conventional type suitable for driving a heavy duty vehicle, and the transmission 13 may also be of a conventional type, such as that disclosed and described in Patent No. 2,637,221. Inasmuch as the invention is directed to a control system for a clutch actuating mechanism, and does not involve the structure of the engine, transmission or clutch, it is believed that further details with respect to the construction of these parts are unnecessary.

As shown in Figure 5, the clutch releasing mechanism 11 is comprised of a power cylinder 22 which is pivotally supported upon the housing 23 of the transmission 13 and contains a piston 24 to which one end of the rod 26 is secured. The other end of said rod 26 is pivotally engaged by the outer end of a clutch actuating arm 27 which is mounted upon the clutch actuating shaft 28 extending from the clutch housing 29. The power cylinder 22 has a pressure inlet opening 31 which enters said cylinder through that end thereof remote from the piston rod 26. Accordingly, the appearance of pressure fluid in the pressure inlet 31 will effect an extension of the piston rod 26 whereby the clutch 12 is disengaged.

The power cylinder 22 is connected to the control system 10 by a pressure fluid conduit 32 which leads to the outlet port 33 (Figure 5) of the relay valve 34. The relay valve 34 is connected by the conduit 146, through the pressure fluid cleaner 142 and the conduit 143 to the source 144 of pressure fluid, which may be compressed air, or in a vacuum system it will be the atmosphere. Said relay valve 34 is also connected by the conduit 86 to the control valve 89 which is connected in turn by the conduit 141 through said pressure fluid cleaner 142 to the source 144. It will become apparent that the valves 34 and 89 may be similar in many respects. However, they are sufficiently different in this embodiment to warrant a full description of each.

The relay valve 34 has a cylindrical body 36 with a pair of co-axial cylindrical chambers 37 and 38 in the opposite axial ends thereof, which are connected by a central, cylindrical passageway 39 having a substantially smaller diameter than the cylindrical chambers 37 and 38. The opposite ends of the wall defining the passageway 39 are beveled to provide the valve seats 41 and 42 adjacent to said recesses. A valve rod 43, which is of smaller diameter than the passageway 39, extends through said passageway into the chambers 37 and 38. Said rod has a pair of integral collars 45 and 46 which are spaced from each other a distance slightly less than the axial length of said passageway 39. A pair of valve heads 47 and 48, which are preferably fabricated from a resilient material, are mounted on said valve rod 43 adjacent to, and on the remote sides of, the collars 45 and 46. Said valve heads 47 and 48 are provided with conic, opposing surfaces for engagement, one at a time, with the valve seats 41 and 42, respectively. Thus, said conic surfaces are spaced from each other a distance somewhat greater than the distance between said valve seats.

Lock collars 50 and 51 are mounted upon the rod 43 adjacent to the remote surfaces of the valve heads 47 and 48 for holding said heads snugly adjacent to their corresponding collars 45 and 46, respectively. Accordingly, axial movement of the rod 43 in a downward direction, as appearing in Figure 5, will cause the valve head 47 to engage the valve seat 41, and upward movement of said rod 43 will cause the valve head 48 to engage the valve seat 42. The collars 45 and 46 will be sufficiently small in outside diameter as to provide no interference with the valve seats 41 and 42 during such movement of the valve rod 43.

The valve head 47 is provided with an integral, radially extending diaphragm or flange 52 which is preferably both resilient and flexible. The upper exhaust chamber 37 has an annular shoulder 53 in its radial wall 54 at a point spaced from the axially inner wall 56 of said chamber. The periphery of said diaphragm 52 snugly embraces said shoulder 53, thereby providing an inner compartment 57 between said inner wall 56 and said diaphragm 52. An upper end plug 58, which snugly embraces the radial wall 54, is held against the periphery of said diaphragm 52 by a snap ring 59 which is engageable with the wall 54 in a conventional manner. The plug 58 is recessed on its lower face to provide the outer compartment 61, disposed between said plug 58 and said diaphragm 52.

Thus, it will be seen that the diaphragm 52 divides the upper chamber 37 into inner and outer compartments 57 and 61, respectively. Said plug 58 has a circular opening 63 into which the upper end of the valve rod 43 is slidably receivable primarily for the purpose of guiding the axial movement of said rod 43. The rod 43 has an annular groove 64 therein near its upper end in which sealing means, such as the O-ring 66, is disposed for engagement with the wall of said opening 63. A seepage outlet 68 communicates through the upper end of the plug 58 with the upper end of the circular opening 63 to prevent the creation of a vacuum or pressure within the upper end of the opening 63 during the reciprocable movement of the rod 43 therein. The upper end plug 58 has a control part 69 which communicates with the outer compartment 61 of the upper valve chamber 37, as appearing in Figure 5. As shown in Figure 6, the valve body 36 is provided with an exhaust port 71 which is connected by the opening 72 to the inner compartment 57 of the upper chamber 37.

The lower valve chamber 38 has an annular shoulder 73 in its radial wall 74 between the axial ends thereof. The valve head 48, disposed within the lower valve chamber 38, has an integral flange or diaphragm 76 which is held near its periphery between the annular shoulder 73 and the opposing recessed face of the lower end plug 77. Thus, said diaphragm 76 divides the lower chamber 38 into inner and outer compartments 78 and 79. The diapnragm 76 is provided with perforations 81 and the lower surface end 82 of the valve rod 43 is disposed within the outer compartment 79. The inner compartment 78 is connected by an opening 83 to the inlet port 84 in the valve body 36.

The control port 69 (Figure 5) in the plug 58 is connected by the conduit 86 to the outlet port 87 in the valve body 88 of the manually operable control valve 89. The valve body 88, and the parts housed thereby, are generally similar to the corresponding parts of the relay valve 34. More specifically, the valve body 88 has cylindrical valve chambers 96 and 97 in the upper and lower axial ends thereof, as appearing in Figure 5, which are closed by the end plugs 93 and 94, and which are connected by the central passageway 98. A valve rod 99 extends through the passageway 98 and supports valve heads 101 and 102 within the chambers 96 and 97, respectively. Said valve heads have beveled surfaces which are alternately engageable with valve seats at the opposite ends of said passageway 98 for closing same.

A pair of diaphragms 103 and 104 extend between the valve heads 101 and 102, respectively, and the radial walls of the chambers 96 and 97 for the purpose of dividing them into inner and outer compartments 105 and 106, and 107 and 108, respectively. Both of the diaphragms 103 and 104 are perforated. The upper end plug 93 has an opening 112 therethrough which is co-axial with said valve rod 99. The upper end 111 of the valve rod 99 is of enlarged diameter and extends from the valve head 101 slidably and snugly through said opening 112 in the upper end plug 93. Sealing means, such as the O-ring 113, is provided between the upper end 111 and the walls of the opening 112 for sealing the space between them. The upper end 111 of the rod 99 is provided with a co-axial recess 114 into which the central guide rod 116 of the thimble 117 is slidably received. The wall of the recess 114 has a pair of diametrically opposed openings therethrough which are elongated axially of said recess 114. A pin 118 extends through the guide rod 116 and through said elongated openings to provide a lost motion connection between the thimble 117 and the valve rod 99.

The upper end 111 of the rod 99 is encircled by a spiral spring 121 which is compressed between the thimble 117 and the outer face of the end plug 93. Movement of the thimble 117 toward the end plug 93 is thus opposed by the spring 121 and is positively limited by engagement between the annular flange 122 on the thimble 117 and the upper end of the valve body 88. However, such engagement between the flange 122 and valve body 88 is arranged so that said thimble 117 hence the valve rod 99, can be moved the distance necessary to unseat the lower valve head 102 and seat the upper valve head 101 for reasons and in a manner appearing hereinafter.

The thimble 117 is engaged upon its upper surface by the arcuate lower surface 123 of the actuating member 124 which is pivotally held with respect to said thimble 117 by the casing 126 which in turn is mounted upon the valve body 88 and extends upwardly therefrom. The casing 126 has a spherically shaped, internal surface 127 near the upper end thereof, as appearing in Figure 5, which is snugly but slidably engaged by a corresponding surface on the actuating member 124. Said spherical surface 127 is penetrated by an opening 128 through which a rod 129 on the actuating member 124 extends. A manually engageable knob 131 is provided upon the upper end of the rod 129. Bearing means, such as the balls 132, may be disposed within recesses 135 in the upper surface of the actuating member 124 adjacent to the spherical surface 127 for facilitating movement therebetween.

The arcuate lower surface 123 of the member 124 has a materially greater radius than the spherical surface 127. Thus, pivotal movement of the actuating member 124 with respect to, and within, the spherical surface 127 will operate through the surface 123 on said member to effect a depression of the thimble 117, against the contrary urging of the spring 121, and a corresponding downward movement of the valve rod 99. A threaded fixture 133 is secured to the lower end of the valve body 88 for threaded reception into the upper end of the shift lever 16.

As shown in Figures 5 and 7, the outlet port 87 in the valve body 88 is connected by the opening 134 to the central passageway 98. An exhaust port 136 (Figure 7) in the valve body 88 is connected by the opening 137 to the inner compartment 105 of the upper exhaust chamber 96. A pressure inlet port 138 is connected by the opening 139 to the inner compartment 107 of the pressure chamber 97. The pressure inlet port 138 is connected by a conduit 141 to a suitable source of pressure fluid. In this particular embodiment, the pressure inlet port 84 in the relay valve 34 is connected by the conduit 146 through the cleaner 142 and thence through the conduit 143 to the source 144 of pressure fluid. However, it will be recognized that the pressure inlet ports 84 and 138 of the relay valve 34 and control valve 89, respectively, may be connected to independent or differing pressure sources by any convenient means, if such becomes desirable. A pressure gauge 147 is connected to the junction of the conduits 141 and 146 for the usual purposes. The pressure fluid cleaner and gauge may be supported by the bracket 148 upon the transmission housing 23 in any convenient manner.

Operation

In general, the control system 10, whereby the clutch releasing mechanism 11 is operated, will automatically effect operation of the clutch releasing mechanism 11 when the shift lever 16 is manually operated in a substantially normal manner. More specifically, a normal shifting force manually applied to the knob 131 on top of the shift lever 16 will automatically open the control valve 89 whereby the relay valve 34 is operated to pass pressure fluid from the source 144 to the clutch releasing mechanism 11. As soon as such force is released from the shift lever, the control valve 89 is immediately closed, thereby closing the relay valve 34 with a resultant deenergization of the releasing mechanism 11.

In greater detail and for the purpose of illustration, the "at rest" position of the control system 10 will first be described. In such position, the transmission 13 is in neutral position, the shift lever 16 is likewise in neutral position, no operating force is being applied to the control knob 131, and the engine 14 is operating.

The actuating member 124, the valve rod 99, and the valve heads 101 and 102 of the control valve 89, will all be in their Figure 5 positions. Thus, pressure fluid which appears in the conduit 141 from the source 144 will flow through the inlet port 138 into the lower, pressure chamber 97 where it will move through the perforations in the diaphragm 104 and apply a pressure against the lower end of the valve rod 99. Inasmuch as there is no counter-acting force available to overcome this pressure, the lower valve head 102 will be urged firmly against its seat at the lower end of the central passageway 98 and thereby preventing the flow of pressure fluid from the inlet port 138 to the outlet port 87. The outlet port 87 will be connected through the passageway 98 and the upper exhaust chamber 96 to the exhaust port 136.

Since the outer compartment 61 of the upper exhaust chamber 37 in the relay valve 34 is connected by the conduit 86 to the outlet port 87 of the control valve 89, said outer compartment 61 will also be connected to exhaust. Thus, prior to arrival of the pressure fluid in the control port 69, the relay valve 34 will be in its Figure 5 position with the lower pressure valve head 48 seated and the exhaust valve head 47 unseated. This arrangement will be due to the fact that pressure fluid in the conduit 146, from the source 144, will pass through the pressure inlet port 84, through the opening 83 into the inner compartment 78 of the pressure chamber 38 and thence through the perforations 81 in the diaphragm 76 into the outer compartment 79, where it will apply a pressure against the lower end surface 82 of the valve rod 43. Because the upper end of the valve rod 43 is disposed where no counterbalancing force can be applied thereto, and the conduit 86 and outer compartment 61 are connected to atmosphere through the exhaust port 136 of the control valve 89, the pressure in the conduit 146 will hold the valve head 48 firmly in its seated position thereby blocking the communication between the lower, pressure chamber 38 and the passageway 39. Thus, as long as pressure remains in the conduit 146, said relay valve 34 will be self-closing and will prevent the flow of pressure fluid between the inlet port 84 and the outlet port 33 thereof.

It will be seen that the large lower surface of the diaphragm 52 will be exposed to the pressure fluid moving into the control passageway 39, and that the conduit 86 is connected to exhaust through the control valve 89. Thus, if there is any hesitancy on the part of the valve 34 to assume its Figure 5 position, the impact of such fluid upon the diaphragm 52 when pressure appears in the conduit 146, will result in an immediate and abrupt closure of the valve 48. In this position of valve 34, the pressure inlet 31 in the power cylinder 22 will be connected through the conduit 32, the outlet port 33 of the relay valve 34, the passageway 39, the inner compartment 57 and the exhaust port 71 to atmosphere.

The upper diaphragm 103 in the control valve 89 is perforated in order to prevent the existence of an air pocket between said diaphragm and the end plug 93. Thus, it does not provide the same closing characteristic provided by the upper diaphragm 52 in the relay valve 34. However, the spiral spring 121 between the end plug 93 and thimble 117 serves substantially the same purpose.

In commencing a shifting operation, the operator will grasp the knob 131 and move it, and consequently the shift lever 16, in the desired shifting direction. However, due to the normal frictional resistance of the shift lever, the application of pressure to the knob 131 will first result in its rocking on its bearings 132. This acts through the cam surface 123 to depress the thimble 117 and thereby move the rod 99 downwardly. This unseats valve 102 and directs pressure fluid from line 141 to line 86. This pressurizes compartment 61, moves valve rod 43 downwardly to unseat valve 48 and admit pressure fluid from line 146 to line 32.

Because of the perforations 81 in the lower diaphragm 76 of the relay valve 34, the seating of the lower valve head 48 will be maintained largely by the action of the pressure fluid in conduit 146 upon the lower, relatively small, end surface 82 of the valve rod 43. Thus, when pressure appears in the conduit 86, hence in the outer compartment 61 of the exhaust chamber 37, it will be acting on the much larger upper surface of the diaphragm 52. Accordingly, even though the pressure in conduit 86 may be somewhat less than the pressure acting against the lower end of the valve rod 43, due to line drop in line 86 where the control 89 is a long distance from the relay valve 34, said valve rod 43 will still be moved downwardly abruptly by the pressure fluid within the outer compartment 61. However, it should be noted that the line 86 is actually a static line and hence the line drop therein will at the most be very small. Hence, said line 86 can be very long without appreciably, if at all, adversely affecting either the speed or the reliability of operation of the apparatus.

When the relay valve 34 is opened by the pressure appearing in the conduit 86, as described above, pressure in the conduit 146 will flow from the inlet port 84 through the pressure chamber 38, the central passageway 39 and out through the outlet port 33 and conduit 32 into the power cylinder 22 whereby the piston 24 therein is moved to operate the clutch actuating arm 27. In this particular embodiment, such operation will effect a release or disengagement of the clutch 12. This operation of the clutch actuating mechanism 11, as a result of moving the actuating member 124 on the control valve 89, will occur in a relatively short period of time, such as less than a second. Accordingly, after the operator has commenced a shift by such operation of the actuating member 124, he will continue to hold pressure on the control knob 131 during said relatively short period of time while declutching is occurring (which period of time will in most instances be so short that the movement of the shift lever is essentially a single continuous motion) after which the shift lever 16 will continue to move in an otherwise substantially conventional manner to effect a conventional shift of the transmission 13 while the clutch 12 remains disengaged due to the continued pressure being imposed upon the actuating member 124 during such shifting movement.

As soon as the shift has been completed, the operator will then release the force which he is exerting on the actuating member 124. Said member will respond to both the pressure fluid in the outer compartment 108 and to the action of the compressed spring 121 and immediately return to its Figure 5, centered position and simultaneously it will return the control valve 89 to its closed position, as appearing in Figure 5, thereby disconnecting the conduit 141 from the conduit 86 and simultaneously connecting said conduit 86 to the exhaust port 136 in said control valve 89.

Exhausting of the conduit 86 will result in an exhausting of the outer compartment 61 of the exhaust chamber 37 in the relay valve 34. The pressure in the conduit 146 will then operate upon the lower end surface 82 of the valve rod 43 to move it upwardly, as appearing in Figure 5, until the valve head 48 engages the valve seat 42 and thereby cuts off the flow of pressure fluid from the conduit 146 to the conduit 32 through the relay valve 34. Simultaneously, the conduit 32 will be connected through the relay valve 34 to the exhaust port 71 thereby exhausting the power cylinder 22. This will permit the clutch 12 to respond to its resilient bias and reengage in a conventional manner. Such reengagement will also return the piston 24 leftwardly toward the pressure inlet 31.

When it becomes desirable to return the transmission from its shifted position into the neutral position, as for the purpose of shifting said transmission into another gear position, the disengagement of the clutch 12, preceding such shift is effected in substantially the same manner as set forth hereinabove. More specifically, the actuating member 124 is manually moved in the desired direction until it opens the control valve 89 whereby the conduit 141 is connected to the conduit 86 so that pressure fluid from the source 144 can again flow into the outer compartment 61 of the exhaust chamber 37 in the relay valve 34. Such pressure fluid in the outer compartment 61 operates the relay valve 34 so that pressure fluid can flow from the conduit 146 through the valve 34 into the conduit 32 and thence into the power cylinder 22 whereby it is again operated to disengage clutch 12. As soon as such disengagement occurs and the usual synchronization of the transmission has been accomplished in a conventional manner, the continued shifting force imposed upon the actuating member 124 will result in a movement of the shift lever 16 whereby said transmission is returned to the neutral position.

Where double clutching is required, the shifting force is momentarily released as the shift lever reaches neutral position, whereby said control valve 89 is closed, thereby closing the relay valve 34 to permit exhausting of the power cylinder 22 and reengagement of the clutch 12. Manual force is then again applied to the actuating member 124, which results in opening the control valve 89 and the relay valve 34, thereby permitting pressure fluid to flow through the conduit 32 to operate the clutch actuating mechanism 11 and disengage said clutch 12. Accordingly, when the declutching and conventional synchronization of the transmission 13 have been completed, continued application of the shifting force to the actuating member 124 will effect a shifting movement of the shift lever 16 and a corresponding shift of the transmission 13 into the newly shifted position. Release of the force on the actuating member 124 will again permit a closure of the control valve 89 which results in a closure of the relay valve 34 thereby deenergizing the clutch releasing mechanism 11, which permits the clutch to reengage.

Although a particular, preferred embodiment of the invention has been disclosed in detail hereinabove for illustrative purposes, it will be understood that variation or modifications thereof which do not depart from the scope of such invention are fully contemplated unless specifically stated to the contrary in the appended claims.

What we claim is:

1. In a power transmitting system for a vehicle having an engine and a change speed transmission, the combination comprising: fluid pressure source means; a clutch connected between said engine and said transmission and fluid pressure actuated clutch operating means; a shift lever connected for operating said transmission; first conduit means connecting said source means to said clutch operating means; first fluid pressure operated valve means in said first conduit means, said first valve means being normally closed to block communication between said source means and said clutch operating means; second conduit means connecting said source means to said first valve means so that when fluid pressure is supplied to said first valve means from said second conduit means it will be moved to an open position; second normally closed valve means in said second conduit means for normally closing said second conduit means; and manually operated means on said shift lever connected for opening said second valve means whereupon said first valve means is opened and said clutch is operated.

2. In a power transmitting system for a vehicle having an engine and a change speed transmission, the combination comprising: a fluid pressure source; a clutch connected between said engine and said transmission and fluid pressure actuated clutch operating means; a shift lever connected for operating said transmission; a first, fluid pressure operated valve, said first valve having an inlet, an outlet and an exhaust port; fluid pressure operated means for normally connecting said outlet port to said exhaust port and normally blocking said outlet port from said inlet port; a first conduit connecting said source to said inlet port and a second conduit connecting said outlet port to said clutch operating means; a second valve mounted on said shift lever and having an inlet, an outlet and an exhaust port; means for normally connecting said outlet port of said second valve to said exhaust port and normally disconnecting said inlet port and said outlet port; a third conduit connecting said source to said inlet port of said second valve and a fourth conduit connecting said outlet port of said second valve to said fluid pressure operated means for said first valve; manually actuable means mounted on said shift lever for shifting said second valve to a condition where the inlet port thereof is connected to the outlet port thereof and said outlet port is disconnected from the exhaust port whereby fluid pressure is applied to said fluid pressure operated means for said first valve to cause same to shift to a position where the inlet port of said first valve is connected to the outlet port thereof whereupon said clutch is actuated.

3. The combination defined in claim 2 wherein said fluid pressure operated means for said first valve means includes an imperforate actuating element mounted in a closed chamber and movable therewithin, said fourth conduit being connected for supplying fluid to said chamber so that pressurizing of said fourth conduit will pressurize said chamber, the pressure in said fourth conduit being essentially static.

4. A remote control system for controlling a clutch for a vehicle having an engine and a change speed transmission, comprising in combination: a fluid pressure source; a clutch connected between said engine and said transmission and fluid pressure actuated clutch operating means; a shift lever connected for operating said transmission, said shift lever having an upper end portion which is movable a limited distance with respect to the remainder thereof and means normally maintaining said upper end portion in predetermined position with respect to the remainder of said shift lever; a first, fluid pressure operated valve, said first valve having an inlet, an outlet and an exhaust port; fluid pressure operated means for normally connecting said outlet port to said exhaust port and normally blocking said outlet port from said inlet port; a first conduit connecting said source to said inlet port and a second conduit connecting said outlet port to said clutch operating means; a second valve mounted on said shift lever and having an inlet, an outlet and an exhaust port; means for normally connecting said outlet port of said second valve to said exhaust port and normally disconnecting said inlet port and said outlet port; a third conduit connecting said source to said inlet port of said second valve and a fourth conduit connecting said outlet port of said second valve to said fluid pressure operated means for said first valve; means connected to said upper end portion of said shift lever for shifting said second valve in response to movement of said upper end portion with respect to the remainder of said shift lever to a position where the inlet port thereof is connected to the outlet port thereof and said outlet port is disconnected from the exhaust port whereby fluid pressure is applied to said fluid pressure operated means for said first valve to cause same to shift to a position where the inlet port of said first valve is connected to the outlet port thereof whereupon said clutch is actuated.

5. A system according to claim 4 wherein said second valve is mounted in said shift lever adjacent the upper end of said remainder thereof; means supporting said upper end portion for pivotal movement with respect to the remainder of said shift lever into and out of axial alignment therewith; means defining a cam surface on the lower end of said upper portion, said cam surface engaging said first valve and being adapted to shift same upon pivotal movement of said upper portion with respect to the remainder of said shift lever.

References Cited in the file of this patent

UNITED STATES PATENTS

| | | |
|---|---|---|
| 410,180 | Ongley | Sept. 3, 1889 |
| 2,104,061 | Surdy | Jan. 4, 1938 |
| 2,153,509 | Rockwell | Apr. 4, 1939 |
| 2,232,974 | Roy | Feb. 25, 1941 |
| 2,263,047 | Newton | Nov. 18, 1941 |
| 2,622,711 | Chambonneau | Dec. 23, 1952 |

FOREIGN PATENTS

| | | |
|---|---|---|
| 621,396 | Great Britain | Apr. 8, 1949 |